(12) United States Patent
Liu et al.

(10) Patent No.: US 11,088,555 B2
(45) Date of Patent: Aug. 10, 2021

(54) ELECTRIC VEHICLE AUTOMATIC CHARGING SYSTEM AND ELECTRIC VEHICLE AUTOMATIC CHARGING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Eddy Liu, New Taipei (TW); Wei-Da Yang, New Taipei (TW); Li-Quan Zhang, Shenzhen (CN); Rui-Rui Lv, Shenzhen (CN); Zhi-Jun Peng, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 263 days.

(21) Appl. No.: 16/278,940

(22) Filed: Feb. 19, 2019

(65) Prior Publication Data
US 2020/0067329 A1    Feb. 27, 2020

(30) Foreign Application Priority Data
Aug. 22, 2018   (CN) .......................... 201810961137.1

(51) Int. Cl.
*H02J 7/00*     (2006.01)
*B60L 53/14*    (2019.01)
(Continued)

(52) U.S. Cl.
CPC ............ *H02J 7/0045* (2013.01); *B60L 53/14* (2019.02); *B60L 53/30* (2019.02); *H01M 50/20* (2021.01); *H01M 2220/20* (2013.01)

(58) Field of Classification Search
CPC ...................................................... H02J 7/0045
(Continued)

(56) References Cited

U.S. PATENT DOCUMENTS 5,187,423 A * 2/1993 Marton ............... H01M 2/1077
                                                       320/109
5,760,569 A * 6/1998 Chase, Jr. ............... B60L 50/66
                                                       320/104
(Continued)

*Primary Examiner* — Edward Tso
*Assistant Examiner* — Ahmed H Omar
(74) *Attorney, Agent, or Firm* — ScienBiziP, P.C.

(57) ABSTRACT

An electric vehicle automatic charging system includes an electric vehicle including a receiving cavity with an opening and a shutter for closing the opening, a battery assembly receiving in the receiving cavity and a charging device. The battery assembly includes a battery pack including an electrode connecting member and a movable bracket including a magnetic member. The charging device includes a support table, a support plate, an electromagnetic fitting member being capable of generating a magnetic force for attracting the magnetic member, and a charger. When the shutter comes into contact with the support plate, the shutter changes from a closed state to an open state, the movable bracket drives the battery pack to move away from the receiving cavity along the support plate by the magnetic force until the electrode connecting member is electrically connected to the charger. An electric vehicle automatic charging method is also provided.

20 Claims, 5 Drawing Sheets

(51) Int. Cl.
*B60L 53/30* (2019.01)
*H01M 50/20* (2021.01)

(58) Field of Classification Search
USPC .......................................................... 320/113
See application file for complete search history.

(56) References Cited

U.S. PATENT DOCUMENTS

| | | | |
|---|---|---|---|
| 2005/0212478 A1* | 9/2005 | Takenaka .............. | A47L 9/2873 320/107 |
| 2011/0068309 A1* | 3/2011 | Haslberger ............... | B60K 1/04 254/2 R |
| 2018/0118174 A1* | 5/2018 | Moskowitz ............. | B60L 53/80 |

* cited by examiner

ELECTRIC VEHICLE AUTOMATIC CHARGING SYSTEM AND ELECTRIC VEHICLE AUTOMATIC CHARGING METHOD

FIELD

The disclosure generally relates to electric vehicles.

BACKGROUNDING

Electric vehicles such as electric forklifts, electric golf carts, and automated guided vehicles usually require charging and replacement of battery boxes manually, a procedure which is time consuming. Therefore, there is room for improvement within the art.

BRIEF DESCRIPTION OF THE DRAWING

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series, and the like. The term "coupled" is defined as connected, whether directly or indirectly through intervening components, and is not necessarily limited to direct physical connection. The connection can be such that the objects are permanently connected or releasably connected.

Figure 1:
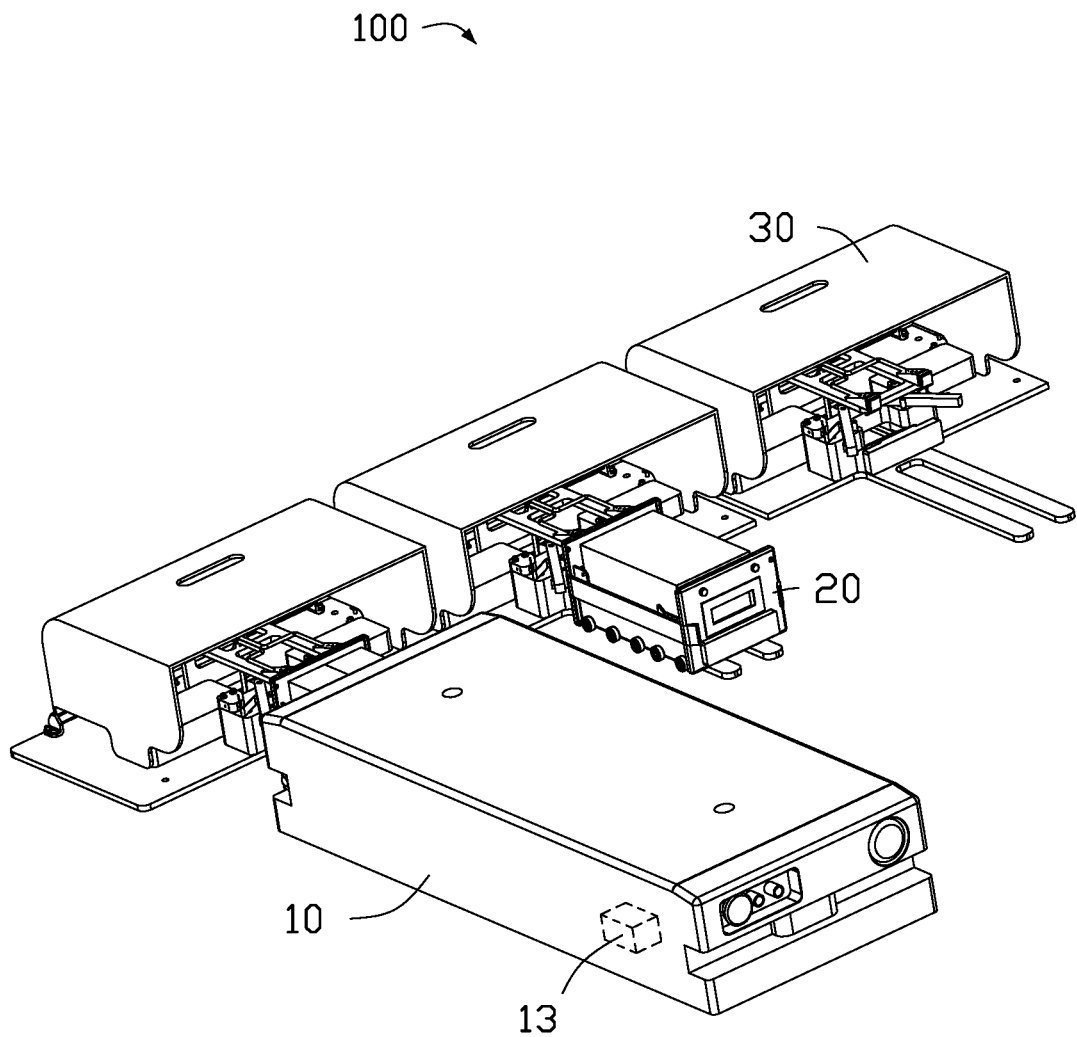
FIG. 1 is a perspective view of an electric vehicle automatic charging system in accordance with an embodiment of the present disclosure.

FIG. 1 shows an electric vehicle automatic charging system 100 of an embodiment of the present disclosure. The electric vehicle automatic charging system 100 includes an electric vehicle 10, a battery assembly 20 for storing electrical energy, and a plurality of charging devices 30 for charging the battery assembly 20.

As shown in FIG. 1, the battery assembly 20 is received in one end of the electric vehicle 10. In this embodiment, there are three charging devices 30. In other embodiment, there can be more charging devices 30, thereby enabling simultaneous charging or battery replacement of more electric vehicles 10.

Each of the plurality of charging devices 30 can charge one battery assembly 20 at a time. The electric vehicle 10 moves to one idle charging device 30 when its battery assembly 20 is low in power. Automatic unloading of the battery assembly 20 can be achieved by cooperative movement of the electric vehicle 10 and the charging device 30. It can be understood that the unloaded battery assembly 20 is electrically connected to the charging device 30 for electrical charging.

In at least one embodiment, after charging is completed, the battery assembly 20 can be reloaded automatically onto the electric vehicle 10. In other embodiments, the electric vehicle 10 can move to another charging device 30 for another battery assembly 20 that is fully charged and have the fully charged battery assembly 20 reloaded by cooperation between the electric vehicle 10 and the charging device 30.

The electric vehicle 10 is an electrically driven mobile device such as an electric forklift, an electric golf cart, or an automated guided vehicle. Taking the automated guided vehicle (AGV) as an example, the AGV can move along a preset path. The automatic charging process of the AGV is that a path for charging is preset for the AGV, so that the AGV can move to an idle charging device 30 according to the preset path. The battery assembly 20 is automatically unloaded and electrically connected to the charging device 30. In addition, the AGV can leave the charging device 30 according to the preset path and move to another charging device 30 to receive and load another battery assembly 20 that is fully charged.

When the plurality of charging devices 30 provides electrical energy to a plurality of electric vehicles 10 having same type of battery assembly 20, and a number of the battery assemblies 20 is greater than the number of electric vehicles 10, lengthy wait time may be shortened, thereby increasing utilization rates of the electric vehicle 10.

Figure 2:
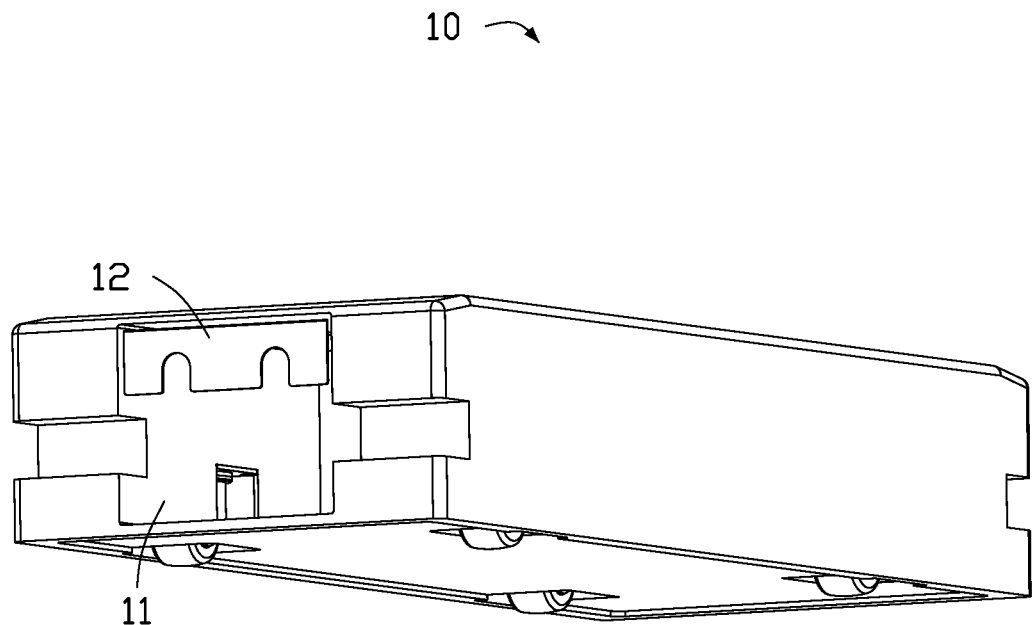
FIG. 2 is a perspective view of an electric vehicle of the electric vehicle automatic charging system shown in FIG. 1.

FIG. 2 shows that the electric vehicle 10 includes a receiving cavity 11 with an opening and a shutter 12 for closing the opening. The shutter 12 is located at one end of the electric vehicle 10. When the shutter 12 is closed, the battery assembly 20 is received in the receiving cavity 11. When the shutter 12 is opened, the battery assembly 20 can move out of the receiving cavity 11 through the opening.

The electric vehicle 10 can further include a backup power source 13 that can drive the electric vehicle 10 to move even after the battery assembly 20 is unloaded. The backup power source 13 may be at times connected to the battery assembly 20 to obtain power replenishment from the battery assembly 20.

Figure 3:
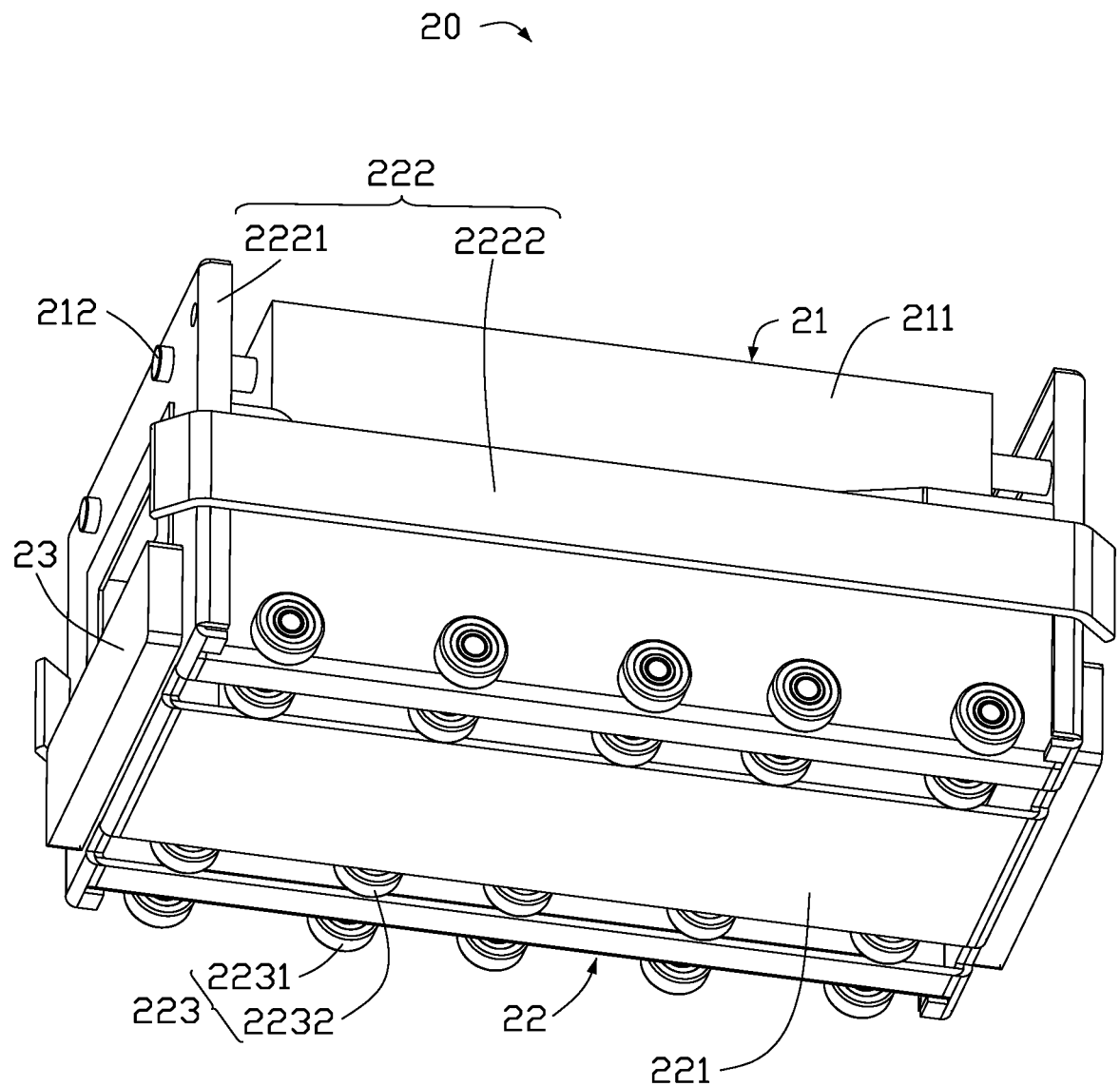
FIG. 3 is a perspective view of a battery assembly of the electric vehicle automatic charging system shown in FIG. 1.

FIG. 3 shows that the battery assembly 20 includes a battery pack 21 for storing electrical energy and a movable bracket 22. The movable bracket 22 can support and limit movement of the battery pack 21 and drive the battery pack 21 to move under force. The battery pack 21 includes a housing 211 and a battery module (not shown) housed in the housing 211. The battery module includes a plurality of batteries electrically connected to each other. It can be understood that the electrical energy stored in one battery may be of small quantity, so to drive the electric vehicle 10, a more powerful the battery module may be required. The housing 211 provides dust- and water-proofing, and protects the battery module housed therein.

Opposite ends of the battery pack 21 are provided with two pairs of electrode connecting members 212. The electrode connecting members 212 are electrically connected to the battery module and protrude out of the housing 211. Each pair of the electrode connecting members 212 includes a negative electrode connecting member 212 and a positive electrode connecting member 212. One pair of electrode connecting members 212 located at one end of the battery pack 21 away from the shutter 12 is electrically connected to the electric vehicle 10, so that the battery module can supply electrical energy to the electric vehicle 10. The other pair of electrode connecting members 212 located at one end of the battery pack 21 adjacent to the shutter 12 is electrically connected to the charging device 30, so that the charging device 30 can connect to the battery module.

The movable bracket 22 includes a base 221, a surrounding plate 222 protruding from one side of the base 221, and a plurality of rollers 223 located on the other side of the base 221. The base 221 and the surrounding plate 222 enclose an open space for placing and limiting movement of the battery pack 21. In at least one embodiment, the housing 211 has a substantially rectangular parallelepiped shape. The surrounding plate 222 includes two first side plates 2221 and two second side plate 2222. The two first side plates 2221 are located at opposing ends of the battery pack 21. Each pair of electrode connecting members 212 protrudes from one of the two first side plates 2221.

One side of each of the two first side plates 2221 away from the battery pack 21 has a magnetic member 23. When the magnetic member 23 is attracted by a magnetic force, the movable bracket 22 can force the battery pack 21 to move.

Figure 4:
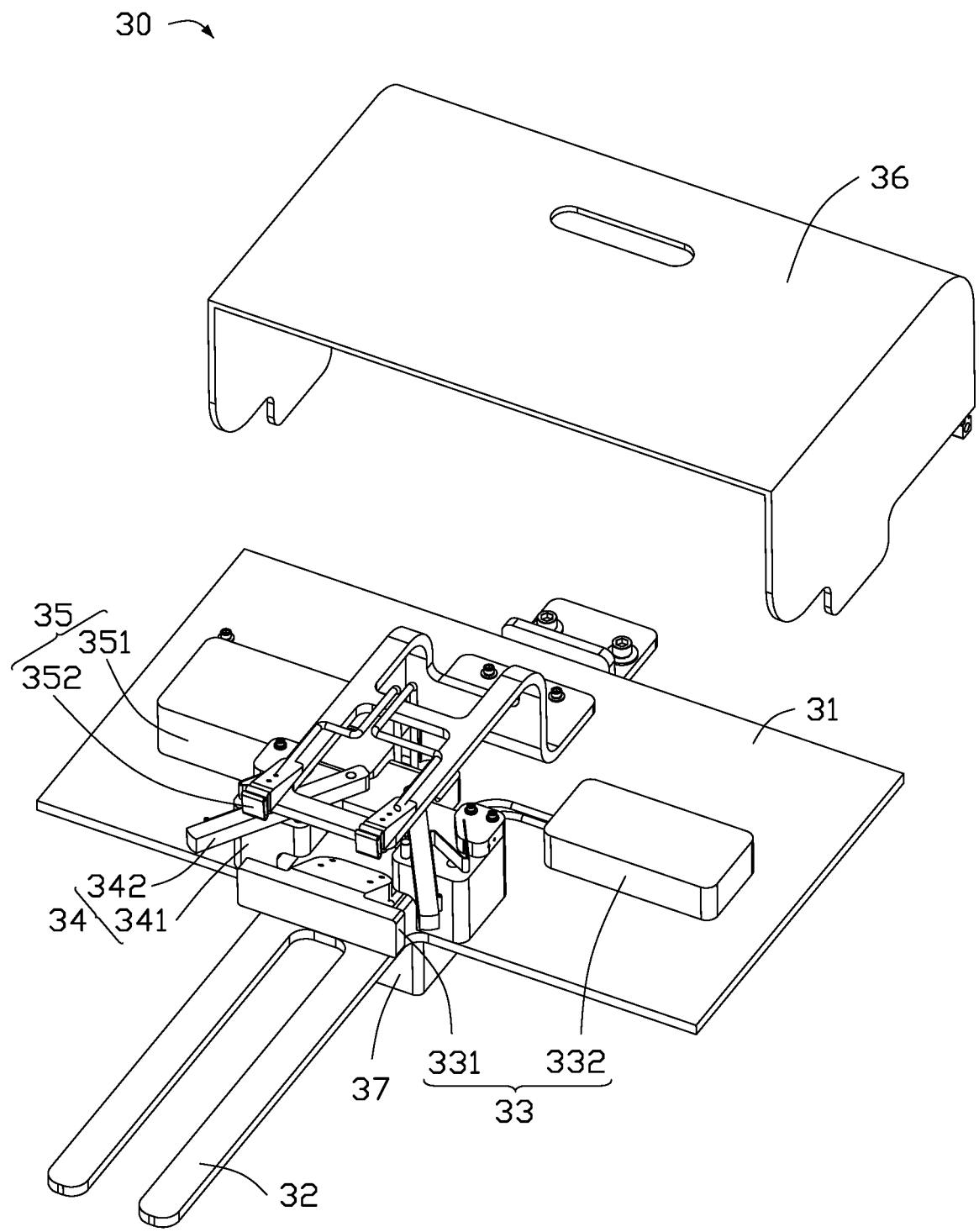
FIG. 4 is a perspective view of a charging device of the electric vehicle automatic charging system shown in FIG. 1.

FIG. 4 shows that the charging device 30 includes a support table 31, a support plate 32 protruding from one side of the support table 31, an electromagnetic fitting member 33, a limiting assembly 34, and a charger 35. The electromagnetic fitting member 33 is located on the support table 31 and includes an electromagnet 331 and a power source 332 capable of energizing the electromagnet 332. When the power source 332 energizes the electromagnet 331, the electromagnet 331 generates the magnetic force for attracting the magnetic member 23.

The limiting assembly 34 is positioned on the support table 31 and includes a fixing base 341 and two limiting strips 342 positioned at an angle. Ends of the two limiting strips 342 adjacent to the corner of are pivotally connected to the fixing base 341. In at least one embodiment, the electromagnet 331 is located between the two limiting strips 342.

The charger 35 includes a body 351 and a charging connector 352 electrically connected to the body 351. In at least one embodiment, there are two charging connectors 352. When the two charging connectors 352 are electrically connected to one pair of electrode connecting members 212 positioned adjacent to the shutter 12, charging of the battery assembly 20 by the charging device 30 can take place.

When the battery assembly 20 is low in power, the electric vehicle 10 moves to one idle charging device 30 until the shutter 12 comes into contact with the support plate 32 of the charging device 30. The shutter 12 changes from a closed state to an open state when it is in contact with the support plate 32. At the same time, the power source 332 energizes the electromagnet 331 so that the electromagnet 331 generates the magnetic force to attract the magnetic member 23 on the battery assembly 20, thereby moving the battery assembly 20 out of the receiving cavity 11. Then, the rollers 223 roll along the support plate 32 until the magnetic member 23 abuts against the electromagnet 331. At the same time, one pair of electrode connecting members 212 adjacent to the shutter 12 is electrically connected to the charging connectors 352, thereby realizing automatic unloading and charging of the battery assembly 20.

In addition, during the movement of the battery assembly 20 toward the electromagnet 331 by the magnetic force, distance between two ends of the two limiting strips 342 away from the fixing base 341 is enlarged by the battery assembly 20, and the angle formed by the two limiting strips 342 is increased. When the battery assembly 20 stops moving, the two limiting strips 342 abut against two sides of the movable bracket 22 to limit the movable bracket 22 and prevent the battery assembly 20 from being shaken.

In at least one embodiment, the plurality of rollers 223 includes two rows of outer rollers 2231 and two rows of inner rollers 2232. Two rows of outer rollers 2231 are arranged in parallel with two rows of inner rollers 2232, and two rows of inner rollers 2232 are located between two rows of outer rollers 2231. In a vertical direction, a lowest point of the outer roller 2231 is located below a lowest point of the inner roller 2232 with the difference in distance being equal to a thickness of the support plate 32.

When the battery assembly 20 is received in the receiving cavity 11, two rows of outer rollers 2231 are in contact with a bottom wall of the receiving cavity 11. At this time, the movement of the battery assembly 20 depends on the rotation of two rows of outer rollers 2231. When the battery assembly 20 moves along the support plate 32, two rows of inner rollers 2232 are in contact with the support plate, thereby the movement of the battery assembly 20 depends on the rotation of two rows of inner rollers 2232. The arrangement of the outer rollers 2231 and the inner rollers 2232 enables the support plate 32 to protrude into the receiving cavity 11 to smoothly move the battery assembly 20 onto the support plate 32.

When the battery assembly 20 needs to be reloaded onto the electric vehicle 10, the power source 332 cuts off power to the electromagnet 331, so that the electromagnet 331 loses magnetic attraction to the magnetic member 23. In at least one embodiment, another electromagnetic fitting member 33 is positioned in the receiving cavity 11 to generate a magnetic force to attract the battery assembly 20 move into the receiving cavity 11. Then, the battery assembly 20 leaves the charging device 30 and is electrically connected to the electric vehicle 10, and the shutter 12 changes from the open state to the closed state.

In at least one embodiment, the charging device 30 further includes a protective cover 36 positioned on the support table 31. The electromagnetic fitting member 33, the limiting assembly 34, and the charger 35 are located in a space surrounded by the protective cover 36 and the support table 31.

In at least one embodiment, the charging device 30 further includes a driving member 37 capable of vertically moving the support table 31. The driving member 37 can be a lifting cylinder. The support table 31 can be lifted or lowered to facilitate the charging device 30 because heights of the battery assemblies 20 in different types of electric vehicles 10 are not standardized.

Figure 5:
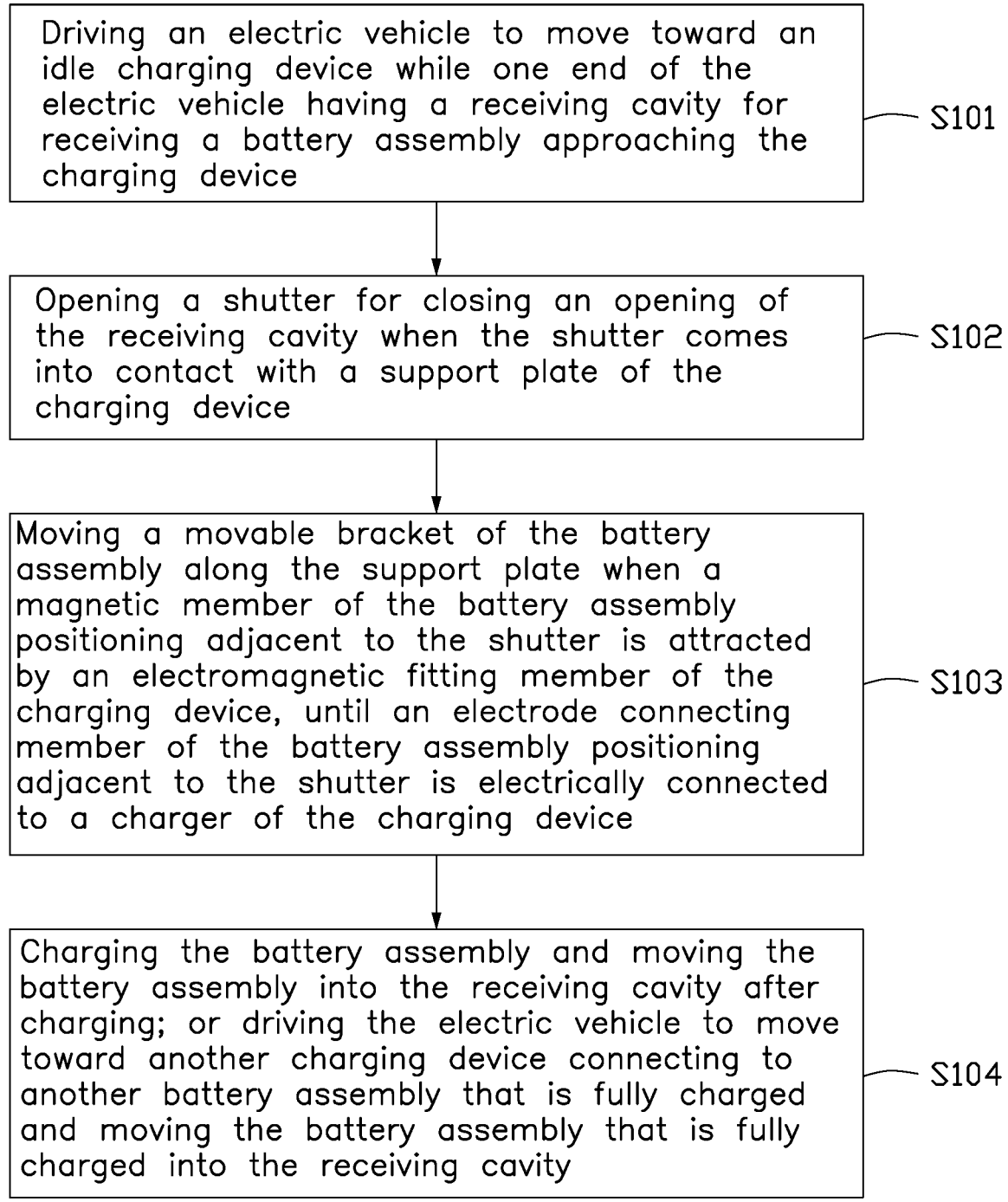
FIG. 5 is a flow chart of an electric vehicle automatic charging method in accordance with an embodiment of the present disclosure.

FIG. 5 shows an electric vehicle automatic charging method, which is applicable to the electric vehicle automatic charging system 100 provided by any of the above embodiments, and the method mainly includes the following blocks:

S101: driving the electric vehicle 10 to move toward one idle charging device 30 while one end of the electric vehicle having the receiving cavity 11 for receiving the battery assembly 20 approaching the charging device 30;

S102: opening the shutter 12 for closing the opening of the receiving cavity 11 when the shutter 12 comes into contact with the support plate 32 of the charging device 30;

S103: moving the movable bracket 22 of the battery assembly 20 along the support plate 32 when the magnetic member 23 of the battery assembly 20 positioning adjacent to the shutter 12 is attracted by the electromagnetic fitting member 33 of the charging device 30, until the electrode connecting member 212 of the battery assembly 20 positioning adjacent to the shutter 12 is electrically connected to the charger 35 of the charging device 30; and S104: charging the battery assembly 20 and moving the battery assembly 20 into the receiving cavity 11 after charging; or driving the electric vehicle 10 to move toward another charging device 30 connecting to another battery assembly 20 that is fully charged and moving the battery assembly 20 that is fully charged into the receiving cavity 11.

Specifically, when the electric vehicle 10 reloads the battery assembly 20 or loads another battery assembly 20 that is fully charged, the electromagnetic fitting member 33 of the charging device 30 loses magnetic attraction to the magnetic member 23 positioning adjacent to the shutter 12, and another electromagnetic fitting member 33 positioning in the receiving cavity 11 generates a magnetic force to attract another magnetic member 23 of the battery assembly 20 locating away from the shutter 12, so that the battery assembly 20 leaves the charging device 30 and enters the receiving cavity 11.

The embodiments shown and described above are only examples. Many details are often found in the art such as the other features of an electric vehicle automatic charging system. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. An electric vehicle automatic charging system, comprising:
   an electric vehicle, comprising:
      a receiving cavity with an opening, and
      a shutter locating at one end of the electric vehicle and configured for closing the opening;
   a battery assembly received in the receiving cavity and comprising:
      a battery pack adapted for storing electrical energy and comprising an electrode connecting member at an end adjacent to the shutter, and
      a movable bracket for supporting the battery pack and comprising a magnetic member at the end adjacent to the shutter; and
   a charging device, comprising:
      a support table,
      a support plate protruding from one side of the support table,
      an electromagnetic fitting member comprises an electromagnet and a power source adapted for energizing the electromagnet to generate a magnetic force for attracting the magnetic member, and
      a charger adapted for charging the battery pack,
   wherein, when the shutter comes into contact with the support plate, the shutter changes from a closed state to an open state, the movable bracket drives the battery pack to move away from the receiving cavity along the support plate by the magnetic force until the electrode connecting member is electrically connected to the charger.

2. The electric vehicle automatic charging system as claimed in claim 1, wherein the charging device comprises a limiting assembly on the support table, the limiting assembly comprises a fixing base and two limiting strips positioning at an angle, and ends of the two limiting strips adjacent to a corner of the angle are pivotally connected to the fixing base.

3. The electric vehicle automatic charging system as claimed in claim 2, wherein the electromagnet is located between the two limiting strips.

4. The electric vehicle automatic charging system as claimed in claim 3, wherein the charger comprises a body on the support table and a charging connector configured for electrically connecting with the electrode connecting member.

5. The electric vehicle automatic charging system as claimed in claim 3, wherein the movable bracket comprises a base, a surrounding plate protruding from one side of the base, and a plurality of rollers on another side of the base; the base and the surrounding plate enclose an open space configured for receiving and limiting the battery pack there within and the magnetic member is fixed to the surrounding plate.

6. The electric vehicle automatic charging system as claimed in claim 5, wherein the plurality of rollers comprises two rows of outer rollers and two rows of inner rollers arranged in parallel with the two rows of outer rollers, a lowest point of the outer rollers is below a lowest point of the inner rollers in a vertical direction.

7. The electric vehicle automatic charging system as claimed in claim 6, wherein a distance between the lowest point of the outer rollers and the lowest point of the inner rollers is equal to a thickness of the support plate.

8. The electric vehicle automatic charging system as claimed in claim 1, wherein the charging device comprises a driving member adapted for driving the support table to move in a vertical direction.

9. The electric vehicle automatic charging system as claimed in claim 2, wherein the charging device comprises a protective cover on the support table, and the electromagnetic fitting member, the limiting assembly and the charger are in a space surrounded by the protective cover and the support table.

10. The electric vehicle automatic charging system as claimed in claim 1, wherein the electric vehicle comprises a backup power source adapted for driving the electric vehicle to move after the battery assembly is unloaded.

11. The electric vehicle automatic charging system as claimed in claim 10, wherein the backup power source is electrically connected to the battery assembly to obtain power replenishment from the battery assembly.

12. The electric vehicle automatic charging system as claimed in claim 1, wherein the battery pack comprises two electrode connecting members at opposing ends of the battery pack, one of the two electrode connecting members is located away from the shutter and configured for electrically connecting with the electric vehicle.

13. The electric vehicle automatic charging system as claimed in claim 1, wherein the movable bracket comprises two magnetic members at opposing ends of the movable bracket, one of the two magnetic members is located away from the shutter and adapted for being attracted by a magnetic force applied by the electric vehicle.

14. An electric vehicle automatic charging method, comprising:
   driving an electric vehicle to move toward an idle charging device, wherein one end of the electric vehicle comprising a receiving cavity configured for receiving a battery assembly;
   opening a shutter of the receiving cavity when the shutter comes into contact with a support plate of the charging device;
   moving a movable bracket of the battery assembly along the support plate when a magnetic member of the battery assembly adjacent to the shutter is attracted by an electromagnetic fitting member of the charging device, until an electrode connecting member of the battery assembly adjacent to the shutter is electrically connected to a charger of the charging device; and
   charging the battery assembly and moving the battery assembly into the receiving cavity after charging.

15. The electric vehicle automatic charging method as claimed in claim 14, wherein when the battery assembly disconnects from the charging device and is received in the receiving cavity after being charged, the electromagnetic fitting member of the charging device loses magnetic attraction to the magnetic member adjacent to the shutter, and another electromagnetic fitting member in the receiving cavity generates a magnetic force to attract another magnetic member of the battery assembly away from the shutter.

16. The electric vehicle automatic charging method as claimed in claim 14, wherein the movable bracket comprises two rows of outer rollers and two rows of inner rollers, when the battery assembly is received in the receiving cavity, the two rows of outer rollers are in contact with a bottom wall of the receiving cavity; when the battery assembly moves along the support plate, the two rows of inner rollers are in contact with the support plate.

17. The electric vehicle automatic charging method as claimed in claim 16, wherein a lowest point of the outer rollers is located below a lowest point of the inner rollers in a vertical direction, and a distance between the lowest point of the outer rollers and the lowest point of the inner rollers is equal to a thickness of the support plate.

18. An electric vehicle automatic charging method, comprising:
   driving an electric vehicle to move toward an idle charging device, wherein one end of the electric vehicle comprising a receiving cavity configured for receiving a battery assembly;
   opening a shutter of the receiving cavity when the shutter comes into contact with a support plate of the charging device;
   moving a movable bracket of the battery assembly along the support plate when a magnetic member of the battery assembly adjacent to the shutter is attracted by an electromagnetic fitting member of the charging device, until an electrode connecting member of the battery assembly adjacent to the shutter is electrically connected to a charger of the charging device; and
   driving the electric vehicle to another charging device having the battery assembly that is fully charged, and moving the battery assembly that is fully charged into the receiving cavity.

19. The electric vehicle automatic charging method as claimed in claim 18, wherein the electromagnetic fitting member of the charging device loses magnetic attraction to the magnetic member of the battery assembly that is fully charged adjacent to the shutter, and another electromagnetic fitting member in the receiving cavity generates a magnetic force to attract another magnetic member of the battery assembly that is fully charged away from the shutter, so that the battery assembly that is fully charged disconnects from the charging device and is received in the receiving cavity.

20. The electric vehicle automatic charging method as claimed in claim 18, wherein the movable bracket comprises two rows of outer rollers and two rows of inner rollers, when the battery assembly is received in the receiving cavity, the two rows of outer rollers are in contact with a bottom wall of the receiving cavity; when the battery assembly moves along the support plate, the two rows of inner rollers are in contact with the support plate.

* * * * *